United States Patent
Saori (10) Patent No.: US 7,542,219 B2
(45) Date of Patent: Jun. 2, 2009

(54) INTERMEDIATE TELEPHOTO LENS SYSTEM

(75) Inventor: Masakazu Saori, Saitama (JP)

(73) Assignee: Hoya Corporation, Tokyo (JP)

(*) Notice: Subject to any disclaimer, the term of this patent is extended or adjusted under 35 U.S.C. 154(b) by 75 days.

(21) Appl. No.: 11/690,275

(22) Filed: Mar. 23, 2007

(65) Prior Publication Data

US 2007/0229983 A1 Oct. 4, 2007

(30) Foreign Application Priority Data

Mar. 28, 2006 (JP) ............... 2006-087295

(51) Int. Cl.
G02B 13/02 (2006.01)

(52) U.S. Cl. ...................... 359/748; 359/691
(58) Field of Classification Search ................ 359/676, 359/691, 745, 748

See application file for complete search history.

(56) References Cited

U.S. PATENT DOCUMENTS

| | | | | | |
|---|---|---|---|---|---|
| 4,508,434 | A | * | 4/1985 | Ogawa | ............... 359/745 |
| 4,784,480 | A | * | 11/1988 | Yokota et al. | ............... 359/776 |
| 5,054,899 | A | * | 10/1991 | Yoneyama | ............... 359/745 |
| 5,959,785 | A | * | 9/1999 | Adachi | ............... 359/692 |
| 6,052,235 | A | | 4/2000 | Ozaki | |
| 6,317,275 | B1 | | 11/2001 | Yoneyama | |
| 6,421,189 | B1 | | 7/2002 | Sensui | |
| 6,519,097 | B2 | | 2/2003 | Ohno | |
| 6,549,343 | B2 | | 4/2003 | Yoneyama | |
| 6,580,568 | B2 | | 6/2003 | Ozaki | |
| 2006/0056066 | A1 | | 3/2006 | Fujisaki et al. | |

FOREIGN PATENT DOCUMENTS

| | | |
|---|---|---|
| JP | 11-271610 | 10/1999 |
| JP | 2000-35534 | 2/2000 |
| JP | 2000-292689 | 10/2000 |
| JP | 2000-330014 | 11/2000 |
| JP | 2001-281535 | 10/2001 |

OTHER PUBLICATIONS

English language abstract of JP 11-271610.
English language abstract of JP 2000-35534.
English language abstract of JP 2000-292689.
English language abstract of JP 2000-330014.
English language abstract of JP 2001-281535.
U.S. Appl. No. 11/672,224 to Saori, filed Feb. 7, 2007.

* cited by examiner

*Primary Examiner*—Darryl J Collins
(74) *Attorney, Agent, or Firm*—Greenblum & Bernstein, P.L.C.

(57) ABSTRACT

An intermediate telephoto lens system includes a positive front lens group, a variable-aperture diaphragm, and a positive rear lens group, in this order from the object.

The positive front lens group includes a positive first lens element L1, a positive second lens element L2 and a negative third lens element L3, in this order from the object.

The positive rear lens group includes cemented lens elements having a negative fourth lens element L4 and a positive fifth lens element L5, and a positive sixth lens element L6, in this order from the object.

The intermediate telephoto lens system satisfies the following condition:

$$2.0 < f/f_{12} < 3.0 \quad (1)$$

wherein
  f designates the focal length of the entire intermediate telephoto lens system; and
  $f_{12}$ designates the combined focal length of the positive first lens element L1 and the positive second lens element L2.

15 Claims, 6 Drawing Sheets

Fig. 10A 
F_NO=1:2.5
-0.5  0.5
SPHERICAL
ABERRATION

THE SINE
CONDITION

— SA
-- SC

Fig. 10B 
F_NO=1:2.5
-0.5  0.5
SPHERICAL
ABERRATION

CHROMATIC
ABERRATION

— d Line
...... g Line
---- C Line

Fig. 10C 
W=12.6°
-0.05  0.05
LATERAL
CHROMATIC
ABERRATION

Fig. 10D 
W=12.6°
-0.5  0.5
ASTIGMATISM

— S
-- M

Fig. 10E
W=12.6°
-5 (%) 5
DISTORTION

Fig. 11

INTERMEDIATE TELEPHOTO LENS SYSTEM

BACKGROUND OF THE INVENTION

1. Field of the Invention

The present invention relates to an intermediate telephoto lens system, having an angle-of-view of approximately 25°, for use in a digital single lens reflex (SLR) camera.

2. Description of the Prior Art

An intermediate telephoto lens system has generally been defined as a lens system having a focal-length range from 75 mm to 135 mm with respect to the 135 (35 mm) film format.

Particularly, an intermediate telephoto lens system with an angle-of-view of 25° (equivalent to a focal length of a little more than 100 mm) has a long-lasting demand (popularity) for portrait use with a single focal length; and for use in a digital SLR camera, further miniaturization of an intermediate telephoto lens system in the optical axis direction has been required (i.e., a thinner lens system).

The size of an imaging device for a digital SLR camera is generally smaller than that of a film-frame of the 135 (35 mm) film format. However, in a digital SLR camera, the flange back length is arranged to be the same as that of a silver-halide film SLR camera so that a photographing lens system designed for a silver-halide film SLR camera can be used with a digital SLR camera, i.e., compatibility between a silver-halide film SLR camera and a digital SLR camera.

Consequently, an exchangeable photographing lens system designed for a digital SLR camera, compared with an exchangeable photographing lens system designed for a silver-halide film SLR camera, inevitably faces a problem to be solved, i.e., the flange back length has to be maintained longer, while the focal length has to be made shorter in proportion to the size of an imaging device.

Note that redesigning conventional photographing lenses system to adjust the same with the size of an imaging device (CCD) cannot solve the above problem, because according to such a simple re-scaling, when the focal length becomes shorter, the back focal distance also becomes shorter.

Moreover, conventional interchangeable lens systems have not sufficiently considered further miniaturization thereof in the optical axis direction (i.e., a thinner lens system).

The present invention is to provide a thinner intermediate telephoto lens system of a modified-Gauss-type in which higher optical performance is attained by (i) adequately distributing refractive power over each lens group, and by (ii) selecting appropriate glass lens materials for the lens elements.

SUMMARY OF THE INVENTION

A modified-Gauss-type intermediate telephoto lens system according to the present invention is arranged to have features based on both an Ernostar-type lens system and a Gauss-type lens system.

As an advantage of the Ernostar type lens system, it is easier to form a telephoto-type lens system, miniaturization of the lens system is attained, and the correcting of spherical aberration and coma is suitably made. On the other hand, an Ernostar-type lens system does not have symmetry regarding a lens arrangement, and is not suitable for the correcting of astigmatism and distortion in the case where the Ernostar-type lens system has a larger angle-of-view.

As an advantage of the Gauss type lens system, symmetry regarding a lens arrangement is suitably maintained, and the correcting of astigmatism and distortion is suitably made. However, a Gauss-type lens system is not suitable for forming a telephoto lens system.

According to an aspect of the present invention, there is provided an intermediate telephoto lens system, with the features of the above Ernostar and Gauss type lens systems, including a front lens group having a positive refractive power (hereinafter, a positive front lens group), an aperture-diameter-variable diaphragm (hereinafter, a variable-aperture diaphragm), and a rear lens group having a positive refractive power (hereinafter, a positive rear lens group), in this order from the object.

The positive front lens group includes a first lens element having a positive refractive power (hereinafter, a positive first lens element L1), a second lens element having a positive refractive power (hereinafter, a positive second lens element L2) and a third lens element having a negative refractive power (a negative third lens element L3), in this order from the object.

The positive rear lens group includes cemented lens elements having a fourth lens element having a negative refractive power (hereinafter, a negative fourth lens element L4) and a fifth lens element having a positive refractive power (hereinafter, a positive fifth lens element L5), and a sixth lens element having appositive refractive power (hereinafter, a positive sixth lens element L6), in this order from the object.

The intermediate telephoto lens system satisfies the following condition:

$$2.0 < f/f_{12} < 3.0 \qquad (1)$$

wherein f designates the focal length of the entire intermediate telephoto lens system; and $f_{12}$ designates the combined focal length of the positive first lens element L1 and the positive second lens element L2.

The intermediate telephoto lens system preferably satisfies the following condition:

$$0.8 < f_F/f_R < 1.8 \qquad (2)$$

wherein $f_F$ designates the focal length of the positive front lens group; and $f_R$ designates the focal length of the positive rear lens group.

According to another aspect of the present invention, there is provided an intermediate telephoto lens system including a positive front lens group, a variable-aperture diaphragm, and a positive rear lens group, in this order from the object.

The positive front lens group includes a positive first lens element L1, a positive second lens element L2 and a negative third lens element L3, in this order from the object.

The positive rear lens group includes cemented lens elements having a negative fourth lens element L4 and a positive fifth lens element L5, and a positive sixth lens element L6, in this order from the object.

The intermediate telephoto lens system satisfies the following condition:

$$0.8 < f_F/f_R < 1.8 \qquad (2)$$

wherein $f_F$ designates the focal length of the positive front lens group; and $f_R$ designates the focal length of the positive rear lens group.

In either aspect of the present invention, the intermediate telephoto lens system preferably satisfies the following conditions:

$$0.5 < f_6/f < 1.0 \quad (3)$$

$$70 \times N_{d6} + v_{d6} < 162 \quad (4)$$

wherein $f_6$ designates the focal length of the positive sixth lens element L6;

f designates the focal length of the entire intermediate telephoto lens system;

$N_{d6}$ designates the refractive index of the d-line of the positive sixth lens element L6; and $v_{d6}$ designates the Abbe number of the positive sixth lens element L6.

In either aspect of the present invention, the positive sixth lens element L6 preferably satisfies the following condition:

$$N_{d6} > 1.70 \quad (5)$$

wherein $N_{d6}$ designates the refractive index of the d-line of the positive sixth lens element L6.

In either aspect of the present invention, it is preferable that an aperture-diameter-fixed diaphragm (hereinafter, a fixed-aperture diaphragm) be provided on the object side of the positive sixth lens element L6.

The present disclosure relates to subject matter contained in Japanese Patent Application No. 2006-87295 (filed on Mar. 28, 2006) which is expressly incorporated herein in its entirety.

BRIEF DESCRIPTION OF THE DRAWINGS

The present invention will be discussed below in detail with reference to the accompanying drawings, in which.

DESCRIPTION OF THE PREFERRED EMBODIMENT

The intermediate telephoto lens system of the present invention, as shown in each embodiment of FIGS. 1, 3, 5, 7 and 9, includes a positive front lens group 10, an aperture-diameter-variable diaphragm VAD (hereinafter, a variable-aperture diaphragm VAD), and a positive rear lens group 20, in this order from the object. In other words, the intermediate telephoto lens system is divided into two lens groups with respect to the variable-aperture diaphragm VAD, i.e., the object-side positive front lens group 10 and the image-side positive rear lens group 20.

Note that in the embodiments, the variable-aperture diaphragm VAD is provided to determine F-number, and fixed at a predetermined position along the optical axis; and the diameter thereof can be varied.

The positive front lens group 10 includes a positive first lens element L1, a positive second lens element L2, and a negative third lens element L3, in this order from the object.

The positive rear lens group 20 includes cemented lens elements having a negative fourth lens element L4 and a positive fifth lens element L5, and a positive sixth lens element L6, in this order from the object.

A symbol "I" designates the image plane.

Condition (1) specifies the ratio of the focal length of the entire intermediate telephoto lens system to the combined focal length of the positive first lens element L1 and the positive second lens element L2 of the positive front lens group 10, i.e., the ratio of the refractive power of the entire intermediate telephoto lens system to the combined refractive power of the positive first lens element L1 and the positive second lens element L2.

In order to attain miniaturization of the lens system, there is a need to provide a strong positive refractive power to the positive front lens group 10. Therefore the combined refractive power of the two positive lens elements L1 and L2 of the positive front lens group 10, which are positioned object-side with respect to the negative third lens element L3, is set to be stronger to the extent that condition (1) is satisfied.

If the combined refractive power of the two positive lens elements L1 and L2 becomes stronger to the extent that $f/f_{12}$ exceeds the upper limit of condition (1), spherical aberration and coma largely occur.

If the combined refractive power of the two positive lens elements L1 and L2 becomes weaker to the extent that $f/f_{12}$ exceeds the lower limit of condition (1), the negative refractive power of the (only one) negative third lens element L3 of the positive front lens group 10 has to be made weaker. Consequently, spherical aberration and coma are undercorrected.

More preferably, the intermediate telephoto lens system satisfies the following condition:

$$2.2 < f/f_{12} < 2.6 \quad (1')$$

Condition (2) specifies the ratio of the focal length of the positive front lens group 10 and that of the positive rear lens group 20, i.e., the ratio of the refractive power of the positive front lens group 10 and that of the positive rear lens group 20.

If the refractive power of the positive front lens group 10 becomes stronger to the extent that $f_F/f_R$ exceeds the lower limit of condition (2), the correcting of spherical aberration and coma cannot be made suitably.

If the refractive power of the positive rear lens group 20 becomes stronger to the extent that $f_F/f_R$ exceeds the upper limit of condition (2), the correcting of coma in the sagittal image cannot be made suitably.

In a modified Gauss-type intermediate telephoto lens system satisfying condition (1), condition (2) is preferably satisfied.

On the other hand, in a modified Gauss-type intermediate telephoto lens system satisfying condition (2), condition (1) may not necessarily be satisfied; and even so, a predetermined effect (though, not completely in a satisfactory level) can be attained.

Conditions (3), (4) and (5) relates to the final lens element of the entire intermediate telephoto lens system (i.e., the positive sixth lens element L6 of the positive rear lens group 20).

In a modified Gauss-type intermediate telephoto lens system, it is preferable that a glass material of a higher Abbe number be used for the positive lens elements in the positive front lens group 10. However, a glass material of a higher Abbe number has a lower refractive index, so that the correcting of spherical aberration and coma become difficult.

On the other hand, for the correcting of spherical aberration and coma, it is preferable that a glass material of a higher refractive index be used for the positive lens elements in the positive front lens group 10. However, a glass material of a higher refractive index has a lower Abbe number, so that lateral chromatic aberration tends to occur.

Then, according to the intermediate telephoto lens system of the embodiments of the present invention, the positive first lens element L1 and the positive second lens element L2 of the positive front lens group 10 are provided with a stronger refractive power to satisfy condition (1); and in addition to satisfying condition (1), for the correcting of lateral chromatic aberration which tends to occur frequently, the positive refractive power of the final lens element (the positive sixth lens element L6) of the positive rear lens group 20 is arranged to satisfy condition (3), and the Abbe number of a glass material and the refractive index thereof are arranged to satisfy conditions (4) and (5).

If the refractive power of the final lens element (i.e., the positive sixth lens element L6 of the positive rear lens group 20) becomes weaker to the extent that $f_6/f$ exceeds the upper limit of condition (3), the correcting of lateral chromatic aberration becomes difficult.

If the refractive power of the final lens element becomes stronger to the extent that $f_6/f$ exceeds the lower limit of condition (3), axial chromatic aberration largely occurs.

On the other hand, conditions (4) and (5) respectively specify the Abbe number (v) and the refractive index (Nd) of a glass lens material to be used for the final lens element.

Figure 11:
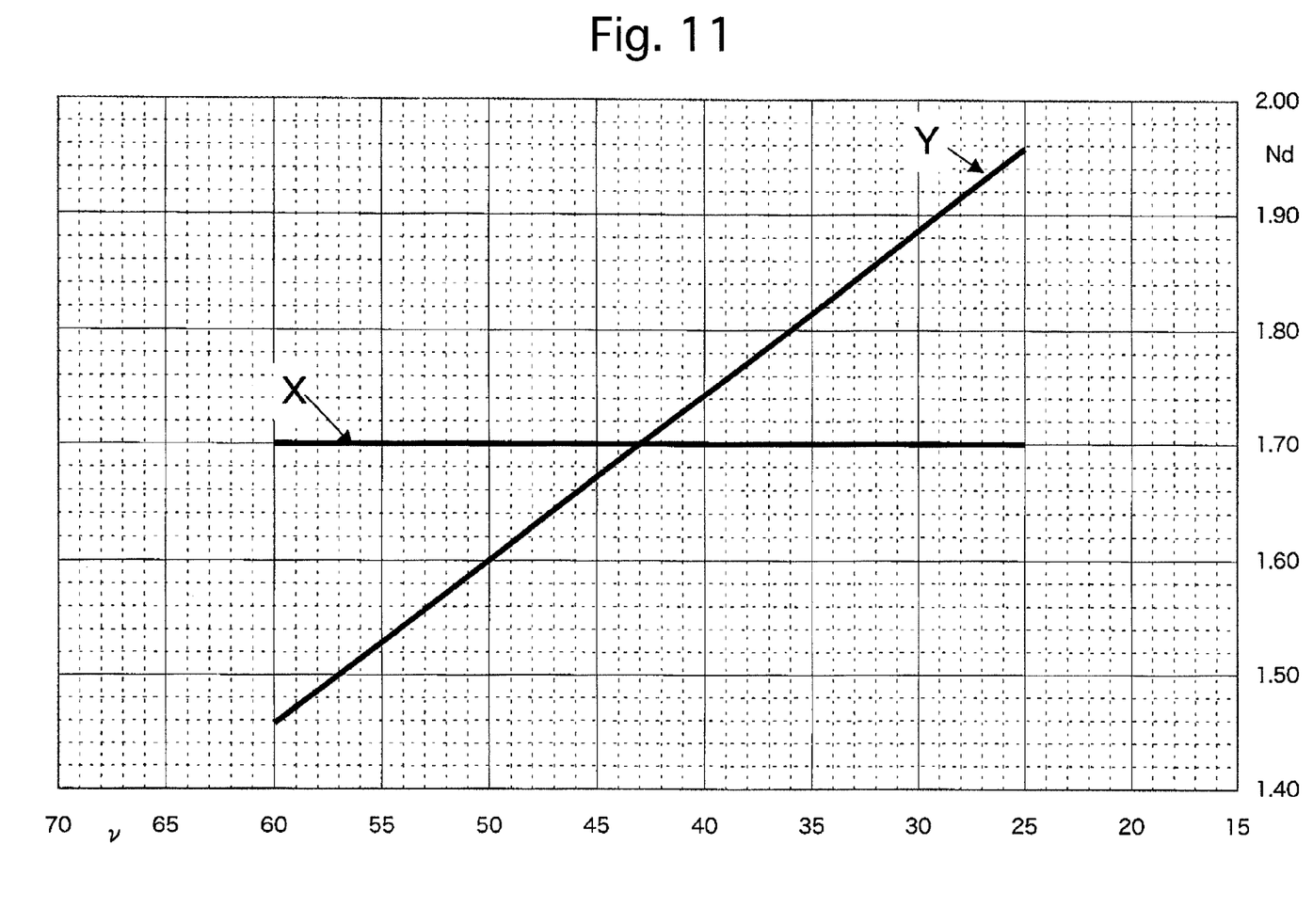
FIG. 11 is a graph showing the distribution of the refractive indices of a glass materials and that of the Abbe numbers for the purpose of explaining conditions (4) and (5).

Condition (4) covers the Abbe numbers of glass materials shown on the right side of the line Y in FIG. 11.

Condition (5) covers the refractive indices of glass materials shown on the upper side of the line X in FIG. 11.

The order of priority with respect to condition (4) and condition (5) is in this order. Namely, it is preferable to first select a glass material in the right side of the line Y (an Abbe number), and thereafter to select a glass material in the upper side of the line X (a refractive index).

On the object-side of the final lens element (between the positive fifth element and the positive sixth lens element), an aperture-diameter-fixed diaphragm (hereinafter, a fixed-aperture diaphragm FAD) is preferably provided to effectively eliminate unnecessary (harmful) off-axis light rays. Furthermore, note that the fixed-aperture diaphragm FAD is immovably provided at a predetermined position along the optical axis.

Specific numerical data of the embodiments will be described hereinafter.

In the diagrams of spherical aberration and the sine condition, SA designates spherical aberration, and SC designates the sine condition.

In the diagrams of chromatic aberration (axial chromatic aberration) represented by spherical aberration, the solid line and the two types of dotted lines respectively indicate spherical aberrations with respect to the d, g and C lines.

In the diagrams of lateral chromatic aberration, the two types of dotted lines respectively indicate magnification with respect to the g and C lines; however, the d line as the base line coincides with the ordinate.

In the diagrams of astigmatism, S designates the sagittal image, and M designates the meridional image.

The tables, FNO. designates the F-number, f designates the focal length of the entire fisheye zoom lens system, W designates the half angle-of-view (°), fB designates the back focal distance, r designates the radius of curvature, d designates the lens-element thickness or a distance between lens elements (lens groups) which is variable upon zooming, $N_d$ designates the refractive index of the d-line, and v designates the Abbe number.

Embodiment 1

Figure 1:
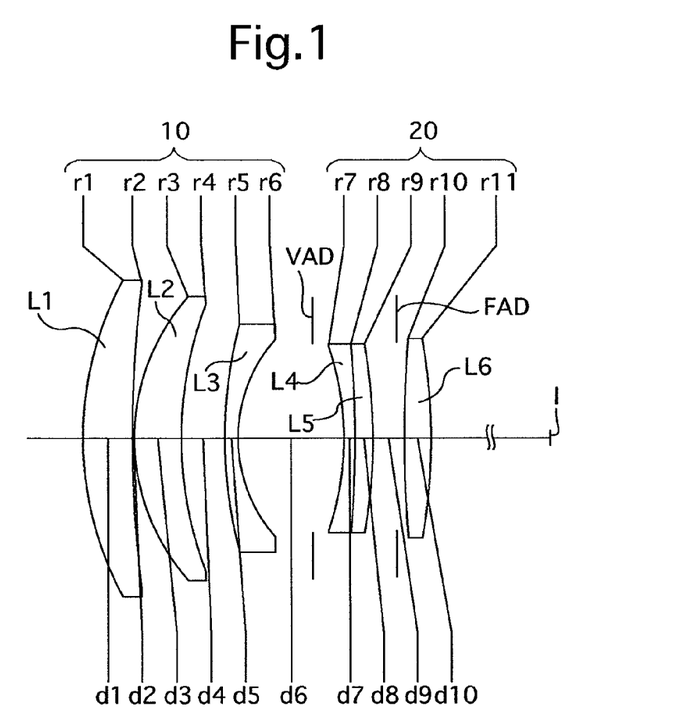
FIG. 1 is a lens arrangement of the intermediate telephoto lens system, according to a first embodiment of the present invention.
Figures 2A, 2B:
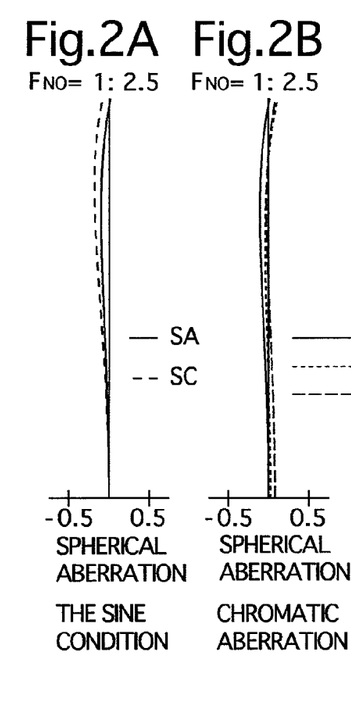
FIGS. 2A, 2B, 2C, 2D and 2E show aberrations occurred in the lens arrangement shown in FIG. 1.
Figures 2C, 2D:
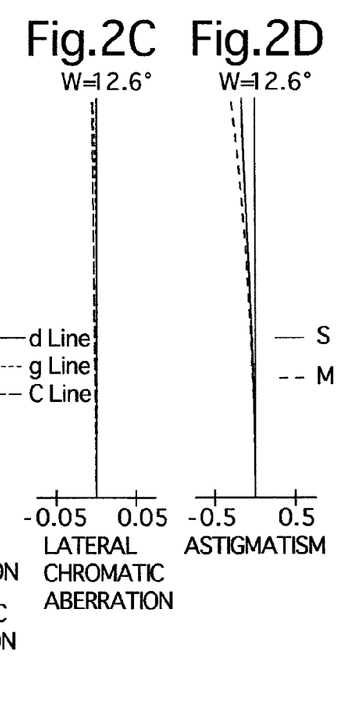
Figure 2E:
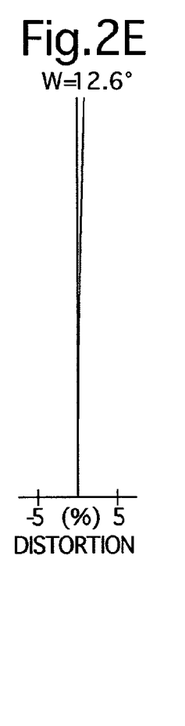

FIG. 1 is the lens arrangement of the intermediate telephoto lens system, according to the first embodiment of the present invention. FIGS. 2A through 2E show aberrations occurred in the lens arrangement shown in FIG. 1.

Table 1 shows the numerical data of the first embodiment.

The positive front lens group 10 includes two positive meniscus lens elements each having the convex surface facing toward the object (the positive first lens element L1 and the positive second lens element L2), and a negative meniscus lens element having the convex surface facing toward the object (the negative third lens element L3), in this order from the object.

The positive rear lens group 20 includes cemented lens elements having a negative meniscus lens element (the negative fourth lens element L4) having the convex surface facing toward the image and a positive meniscus lens element (the positive fifth lens element L5) having the convex surface facing toward the image, and a biconvex positive lens element (the positive sixth lens element L6), in this order from the object.

The variable-aperture diaphragm VAD is positioned 2.779 in front of (on the object side) of the positive rear lens group 20 (surface No. 7).

The fixed-aperture diaphragm FAD is positioned 0.5 in front of the positive sixth lens element L6 (surface No. 10).

TABLE 1

FNO. = 1:2.5
f = 67.74
W = 12.6
fB = 37.80

| Surf. No. | r | d | Nd | v |
|---|---|---|---|---|
| 1 | 29.470 | 4.39 | 1.69799 | 55.5 |
| 2 | 112.728 | 0.17 | | |
| 3 | 19.182 | 4.08 | 1.68159 | 57.5 |
| 4 | 33.855 | 3.80 | | |
| 5 | 40.345 | 1.15 | 1.79425 | 25.5 |
| 6 | 13.258 | 9.34 | | |
| 7 | -25.121 | 1.00 | 1.67648 | 44.0 |
| 8 | -91.171 | 1.60 | 1.54354 | 60.1 |

TABLE 1-continued

FNO. = 1:2.5
f = 67.74
W = 12.6
fB = 37.80

| Surf. No. | r | d | Nd | ν |
|---|---|---|---|---|
| 9 | −46.171 | 2.80 | | |
| 10 | 112.557 | 2.40 | 1.80100 | 35.0 |
| 11 | −49.502 | — | | |

Embodiment 2

Figure 3:
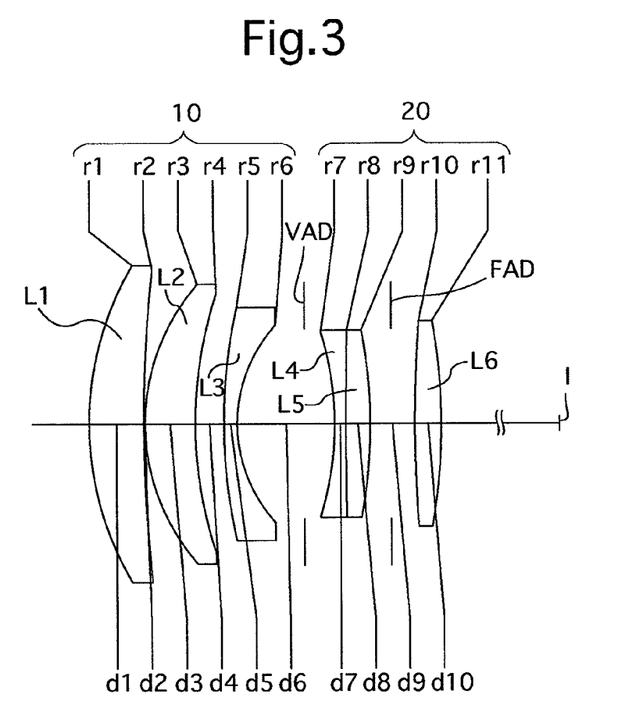
FIG. 3 is a lens arrangement of the intermediate telephoto lens system, according to a second embodiment of the present invention.
Figures 4A, 4B:
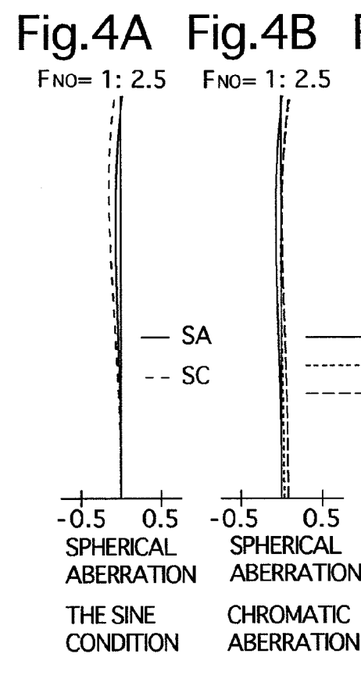
FIGS. 4A, 4B, 4C, 4D and 4E show aberrations occurred in the lens arrangement shown in FIG. 3.
Figure 4C:
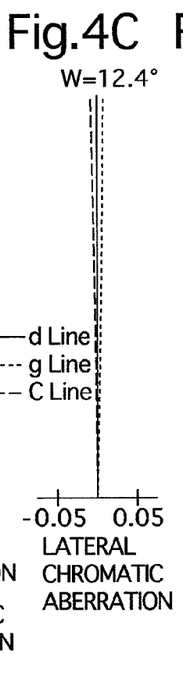
Figure 4D:
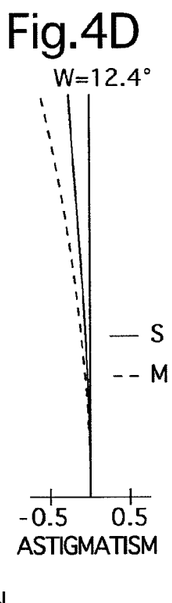
Figure 4E:
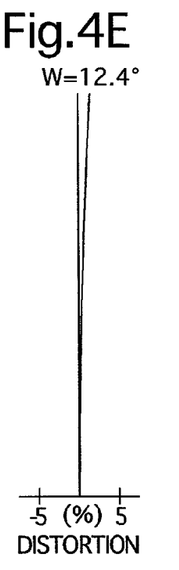

FIG. 3 is the lens arrangement of the intermediate telephoto lens system, according to the second embodiment of the present invention. FIGS. 4A through 4E show aberrations occurred in the lens arrangement shown in FIG. 3.

Table 2 shows the numerical data of the second embodiment.

Except that the negative fourth lens element L4 is constituted by a biconcave lens element, and that the positive fifth lens element L5 is constituted by a biconvex lens element, the basic lens arrangement of the second embodiment is the same as that of the first embodiment.

The variable-aperture diaphragm VAD is positioned 2.709 in front of (on the object side of) the positive rear lens group 20 (surface No. 7).

The fixed-aperture diaphragm FAD is positioned 1.0 in front of the positive sixth lens element L6 (surface No. 10).

TABLE 2

FNO. = 1:2.5
f = 68.61
W = 12.4
fB = 37.82

| Surf. No. | r | d | Nd | ν |
|---|---|---|---|---|
| 1 | 27.592 | 4.79 | 1.69800 | 55.4 |
| 2 | 128.800 | 0.10 | | |
| 3 | 18.864 | 4.35 | 1.70000 | 52.8 |
| 4 | 37.575 | 2.43 | | |
| 5 | 47.568 | 1.15 | 1.80500 | 27.4 |
| 6 | 12.953 | 8.56 | | |
| 7 | −26.971 | 1.00 | 1.68621 | 43.1 |
| 8 | 467.350 | 2.13 | 1.51000 | 57.9 |
| 9 | −43.916 | 3.92 | | |
| 10 | 126.347 | 2.30 | 1.74950 | 35.3 |
| 11 | −49.633 | — | | |

Embodiment 3

Figure 5:
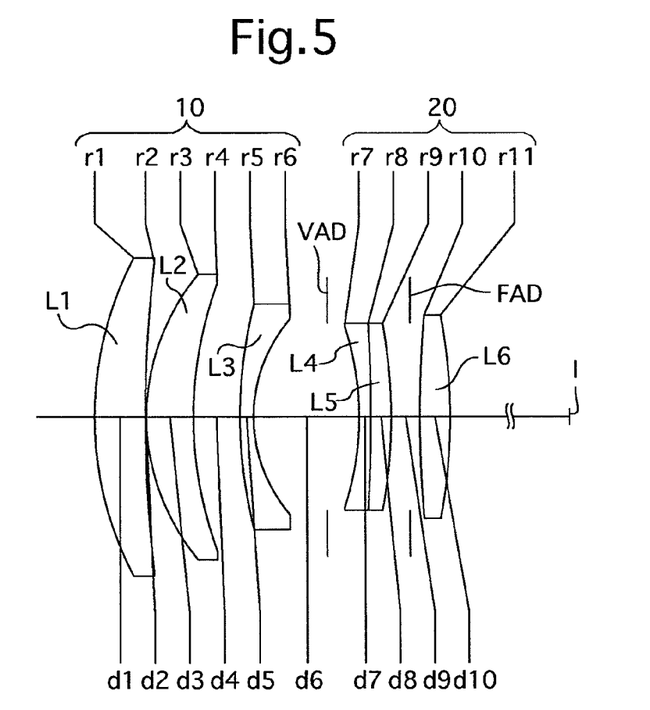
FIG. 5 is a lens arrangement of the intermediate telephoto lens system, according to a third embodiment of the present invention.
Figure 6A:
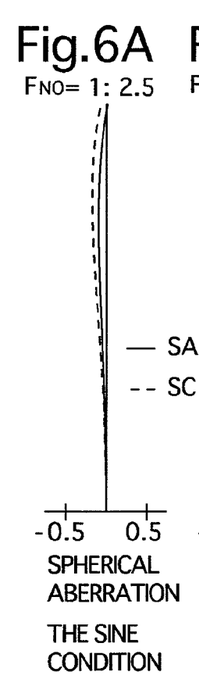
FIGS. 6A, 6B, 6C, 6D and 6E show aberrations occurred in the lens arrangement shown in FIG. 5.
Figure 6B:
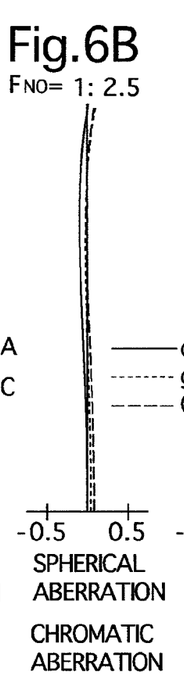
Figures 6C, 6D:
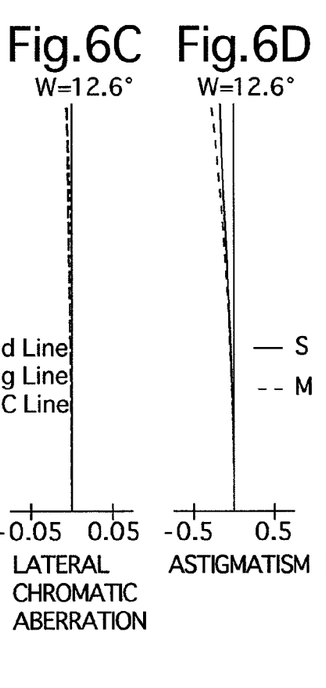
Figure 6E:
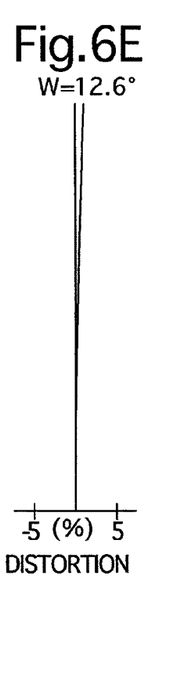

FIG. 5 is the lens arrangement of the intermediate telephoto lens system, according to the third embodiment of the present invention. FIGS. 6A through 6E show aberrations occurred in the lens arrangement shown in FIG. 5.

Table 3 shows the numerical data of the third embodiment.

The basic lens arrangement of the third embodiment is the same as that of the first embodiment.

The variable-aperture diaphragm VAD is positioned 2.766 in front of (on the object side of) the positive rear lens group 20 (surface No. 7).

The fixed-aperture diaphragm FAD is positioned 1.0 in front of the positive sixth lens element L6 (surface No. 10).

TABLE 3

FNO. = 1:2.5
f = 67.98
W = 12.6
fB = 37.82

| Surf. No. | r | d | Nd | ν |
|---|---|---|---|---|
| 1 | 29.656 | 4.42 | 1.69680 | 55.5 |
| 2 | 117.289 | 0.10 | | |
| 3 | 19.388 | 4.05 | 1.69680 | 55.5 |
| 4 | 33.751 | 3.98 | | |
| 5 | 40.398 | 1.16 | 1.78517 | 25.7 |
| 6 | 13.144 | 9.09 | | |
| 7 | −24.905 | 1.00 | 1.69840 | 32.0 |
| 8 | −132.229 | 1.78 | 1.52814 | 57.8 |
| 9 | −42.826 | 2.48 | | |
| 10 | 107.827 | 2.63 | 1.75940 | 28.9 |
| 11 | −45.857 | — | | |

Embodiment 4

Figure 7:
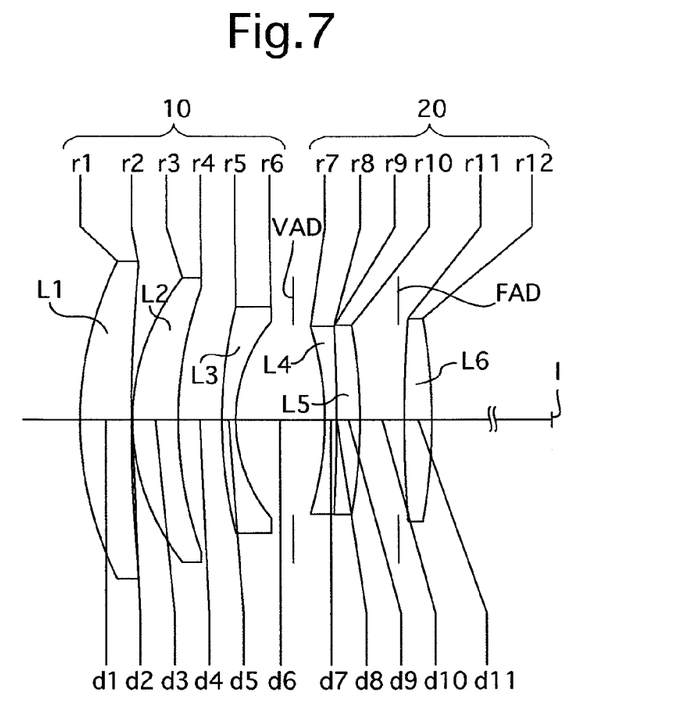
FIG. 7 is a lens arrangement of the intermediate telephoto lens system, according to a fourth embodiment of the present invention.
Figure 8A:
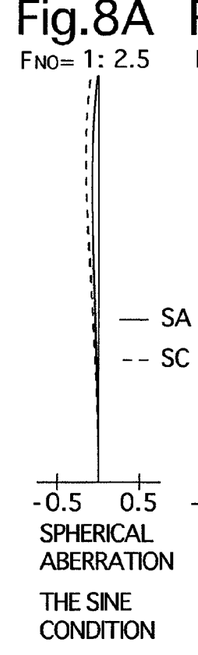
FIGS. 8A, 8B, 8C, 8D and 8E show aberrations occurred in the lens arrangement shown in FIG. 7.
Figures 8B, 8C:
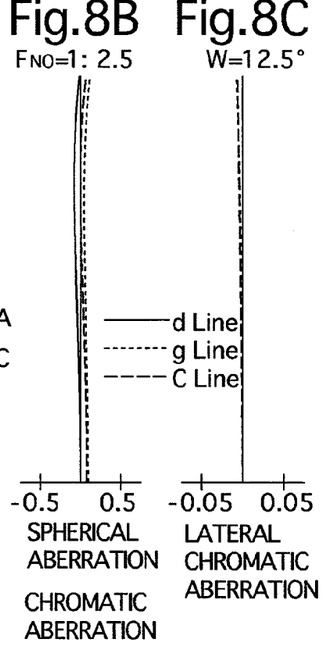
Figure 8D:
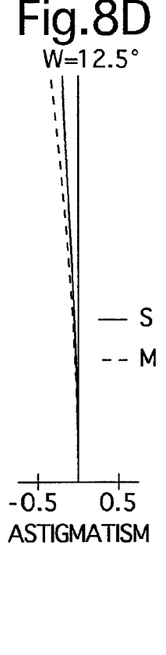
Figure 8E:
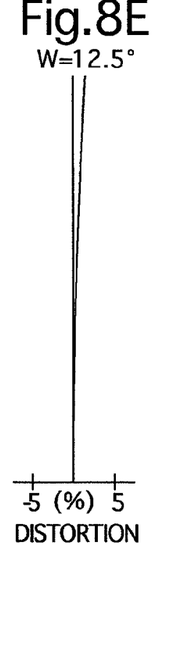

FIG. 7 is the lens arrangement of the intermediate telephoto lens system, according to the fourth embodiment of the present invention. FIGS. 8A through 8E show aberrations occurred in the lens arrangement shown in FIG. 7.

Table 4 shows the numerical data of the fourth embodiment.

The basic lens arrangement of the fourth embodiment is the same as that of the first embodiment.

The variable-aperture diaphragm VAD is positioned 2.690 in front of (on the object side) of the positive rear lens group 20 (surface No. 7).

The fixed-aperture diaphragm FAD is positioned 1.0 in front of the positive sixth lens element L6 (surface No. 10).

TABLE 4

FNO. = 1:2.5
f = 68.02
W = 12.5
fB = 37.97

| Surf. No. | r | d | Nd | ν |
|---|---|---|---|---|
| 1 | 30.730 | 4.49 | 1.69680 | 55.5 |
| 2 | 148.000 | 0.10 | | |
| 3 | 19.823 | 3.98 | 1.72916 | 54.7 |
| 4 | 33.912 | 3.81 | | |
| 5 | 40.674 | 1.20 | 1.78472 | 25.7 |
| 6 | 13.418 | 7.65 | | |
| 7 | −27.534 | 1.00 | 1.69895 | 30.1 |
| 8 | −141.500 | 1.98 | 1.51633 | 64.1 |
| 9 | −47.175 | 3.85 | | |
| 10 | 129.576 | 2.39 | 1.75520 | 27.5 |
| 11 | −49.700 | — | | |

Embodiment 5

Figure 9:
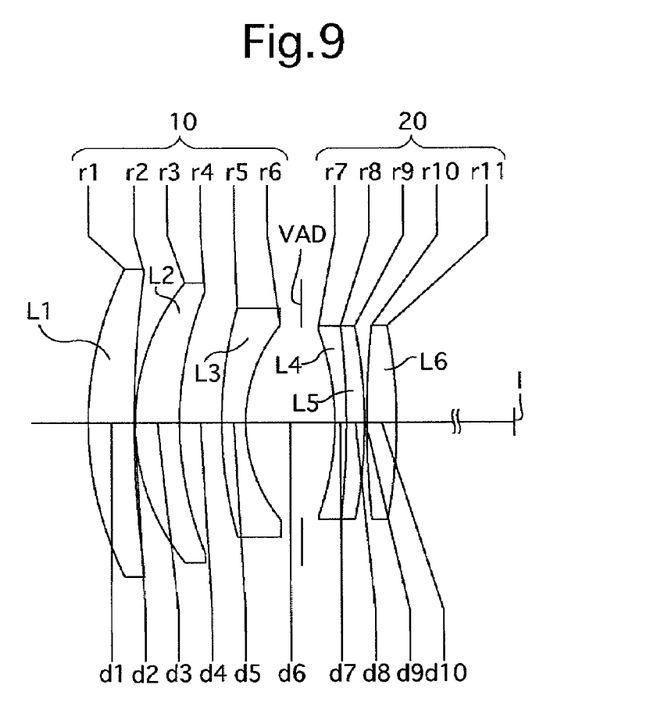
FIG. 9 is a lens arrangement of the intermediate telephoto lens system, according to a fifth embodiment of the present invention.
Figure 10A:
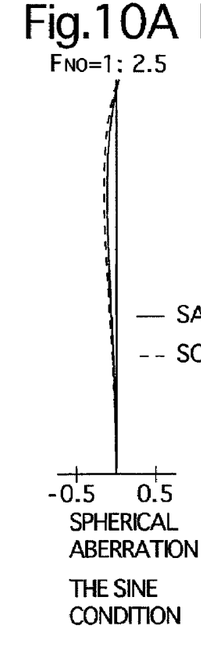
FIGS. 10A, 10B, 10C, 10D and 10E show aberrations occurred in the lens arrangement shown in FIG. 9.
Figure 10B:
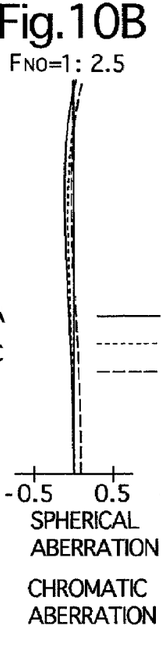
Figure 10C:
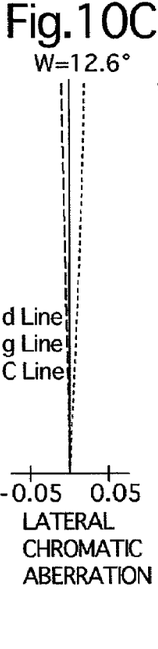
Figures 10D, 10E:
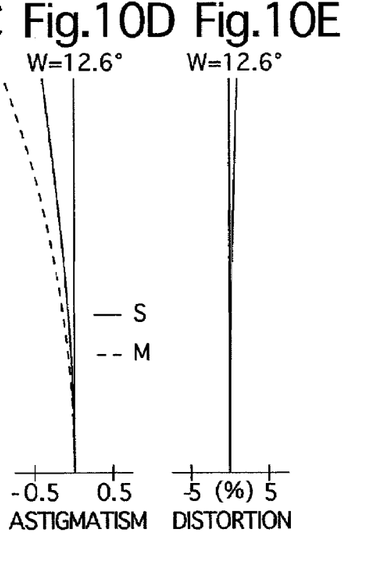

FIG. 9 is the lens arrangement of the intermediate telephoto lens system, according to the fifth embodiment of the present invention. FIGS. 1A through 10E show aberrations occurred in the lens arrangement shown in FIG. 9.

Table 5 shows the numerical data of the fifth embodiment.

The basic lens arrangement of the fifth embodiment is the same as that of the first embodiment.

The variable-aperture diaphragm VAD is positioned 2.986 in front of (on the object side of) the positive rear lens group 20 (surface No. 7).

There is no fixed-aperture diaphragm provided in this embodiment.

TABLE 5

FNO. = 1:2.5
f = 67.99
W = 12.6
fB = 40.98

| Surf. No. | r | d | Nd | ν |
|---|---|---|---|---|
| 1 | 30.873 | 4.09 | 1.69680 | 55.5 |
| 2 | 100.644 | 0.10 | | |
| 3 | 19.797 | 4.01 | 1.69680 | 55.5 |
| 4 | 31.440 | 3.77 | | |
| 5 | 38.718 | 2.14 | 1.79127 | 25.5 |
| 6 | 13.758 | 7.99 | | |
| 7 | −24.484 | 1.00 | 1.71337 | 29.0 |
| 8 | −73.439 | 1.61 | 1.53168 | 64.5 |
| 9 | −43.387 | 0.19 | | |
| 10 | 89.343 | 2.63 | 1.77573 | 29.7 |
| 11 | −46.180 | — | | |

The numerical values of each condition for each embodiment are shown in Table 6.

TABLE 6

| | Embod. 1 | Embod. 2 | Embod. 3 | Embod. 4 | Embod. 5 |
|---|---|---|---|---|---|
| Cond. (1) | 2.36 | 2.74 | 2.37 | 2.39 | 2.10 |
| Cond. (2) | 1.30 | 0.89 | 1.25 | 1.02 | 1.69 |
| Cond. (3) | 0.64 | 0.70 | 0.63 | 0.70 | 0.58 |
| Cond. (4) | 161 | 158 | 152 | 150 | 154 |
| Cond. (5) | 1.80100 | 1.74950 | 1.75940 | 1.75520 | 1.77573 |

As can be understood from Table 6, the first through fifth embodiments satisfy conditions (1) through (5). Furthermore, as can be understood from the aberration diagrams, the various aberrations are adequately corrected.

According to the descriptions, a thinner intermediate telephoto lens system of a modified-Gauss-type in which higher optical performance is attained can be obtained by (i) adequately distributing refractive power over each lens group, and by (ii) selecting appropriate glass materials for the lens elements.

What is claimed is:

1. An intermediate telephoto lens system comprises a positive front lens group, a variable-aperture diaphragm, and a positive rear lens group, in this order from an object, without another lens intermediate said positive front lens group and said positive rear lens group, wherein said positive front lens group comprises a positive first lens element L1, a positive second lens element L2 and a negative third lens element L3, in this order from the object;

wherein said positive rear lens group comprises cemented lens elements having a negative fourth lens element L4 and a positive fifth lens element L5, and a positive sixth lens element L6, in this order from the object; and wherein said intermediate telephoto lens system satisfies the following condition:

$$2.0 < f/f_{12} < 3.0$$

wherein f designates the focal length of the entire intermediate telephoto lens system; and $f_{12}$ designates the combined focal length of said positive first lens element L1 and said positive second lens element L2.

2. The intermediate telephoto lens system according to claim 1, further satisfying the following condition:

$$0.8 < f_F/f_R < 1.8$$

wherein $f_F$ designates the focal length of said positive front lens group; and $f_R$ designates the focal length of said positive rear lens group.

3. The intermediate telephoto lens system according to claim 1, further satisfying the following conditions:

$$0.5 < f_6/f < 1.0$$

$$70 \times N_{d6} + \nu_{d6} < 162$$

wherein $f_6$ designates the focal length of said positive sixth lens element L6;

f designates the focal length of the entire intermediate telephoto lens system;

$N_{d6}$ designates the refractive index of the d-line of said positive sixth lens element L6; and $\nu_{d6}$ designates the Abbe number of said positive sixth lens element L6.

4. The intermediate telephoto lens system according to claim 3, further satisfying the following condition:

$$N_{d6} > 1.70$$

wherein $N_{d6}$ designates the refractive index of the d-line of said positive sixth lens element L6.

5. The intermediate telephoto lens system according to claim 1, wherein a fixed-aperture diaphragm is provided on the object side of said positive sixth lens element L6.

6. The intermediate telephoto lens system according to claim 1, wherein the intermediate telephoto lens system consists of six lens elements.

7. The intermediate telephoto lens system according to claim 1, wherein the positive front lens group consists of three lens elements.

8. The intermediate telephoto lens system according to claim 1, wherein the positive rear lens group consists of three lens elements.

9. An intermediate telephoto lens system comprises a positive front lens group, a variable-aperture diaphragm, and a positive rear lens group, in this order from an object, without another lens intermediate said positive front lens group and said positive rear lens group, wherein said positive front lens group comprises a positive first lens element L1, a positive second lens element L2 and a negative third lens element L3, in this order from the object;

wherein said positive rear lens group comprises cemented lens elements having a negative fourth lens element L4 and a positive fifth lens element L5, and a positive sixth lens element L6, in this order from the object; and wherein said intermediate telephoto lens system satisfies the following condition:

$$0.8 < f_F/f_R < 1.8$$

wherein $f_F$ designates the focal length of said positive front lens group; and $f_R$ designates the focal length of said positive rear lens group.

10. The intermediate telephoto lens system according to claim 9, further satisfying the following conditions:

$$0.5 < f_6/f < 1.0$$

$$70 \times N_{d6} + v_{d6} < 162$$

wherein $f_6$ designates the focal length of said positive sixth lens element L6;

f designates the focal length of the entire intermediate telephoto lens system;

$N_{d6}$ designates the refractive index of the d-line of said positive sixth lens element L6; and $v_{d6}$ designates the Abbe number of said positive sixth lens element L6.

11. The intermediate telephoto lens system according to claim 10, further satisfying the following condition:

$$N_{d6} > 1.70$$

wherein $N_{d6}$ designates the refractive index of the d-line of said positive sixth lens element L6.

12. The intermediate telephoto lens system according to claim 9, wherein a fixed-aperture diaphragm is provided on the object side of said positive sixth lens element L6.

13. The intermediate telephoto lens system according to claim 9, wherein the intermediate telephoto lens system consists of six lens elements.

14. The intermediate telephoto lens system according to claim 9, wherein the positive front lens group consists of three lens elements.

15. The intermediate telephoto lens system according to claim 9, wherein the positive rear lens group consists of three lens elements.

* * * * *